J. ROSALES.
SURVEYING INSTRUMENT.
APPLICATION FILED APR. 8, 1920.
1,380,333.
Patented May 31, 1921.
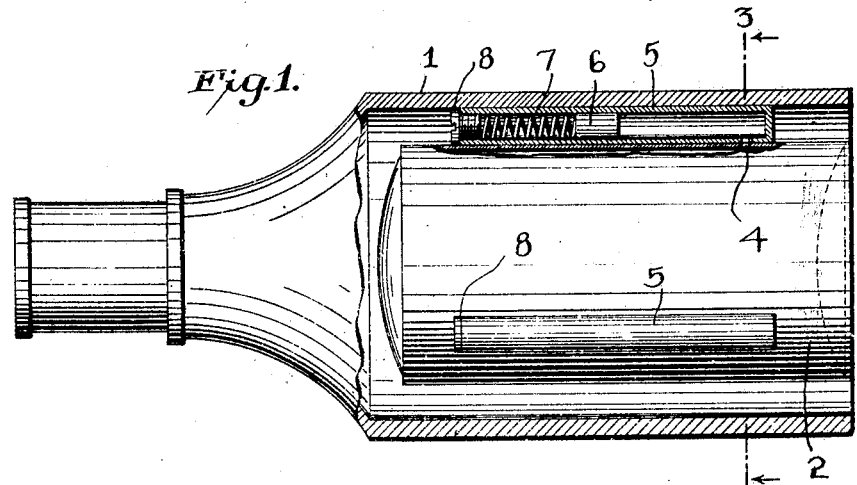
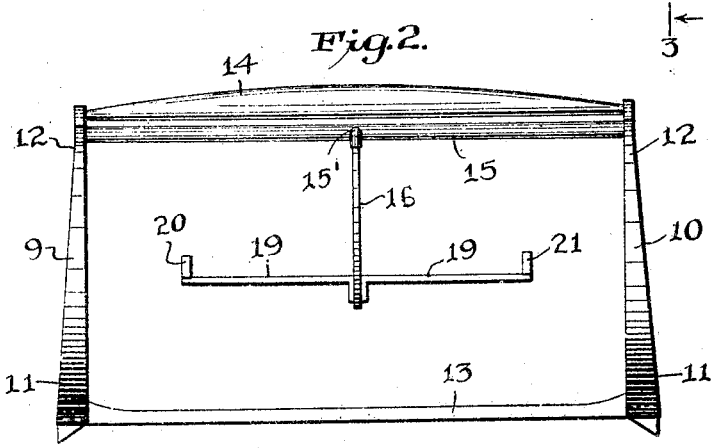
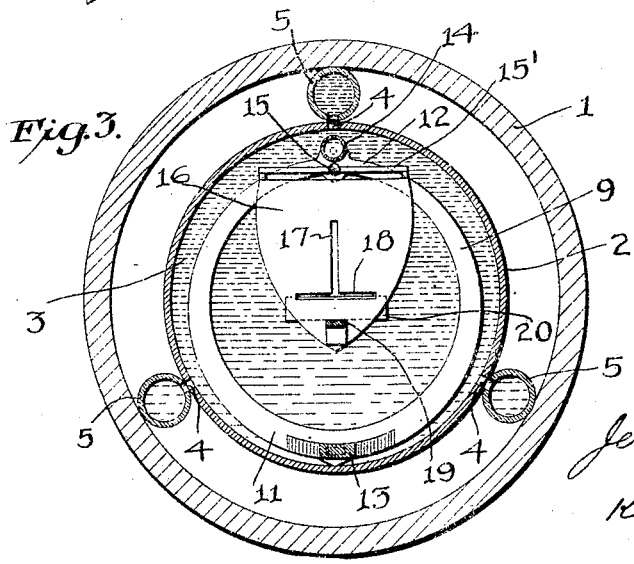
INVENTOR
Jerman Rosales
BY
Kiddle & Marqueson
ATTORNEYS

UNITED STATES PATENT OFFICE.

JERMAN ROSALES, OF NEW YORK, N. Y.

SURVEYING INSTRUMENT.

1,380,333.  Specification of Letters Patent.  Patented May 31, 1921.

Application filed April 8, 1920. Serial No. 372,123.

*To all whom it may concern:*

Be it known that I, JERMAN ROSALES, a citizen of the Republic of Chile, and a resident of the borough of Manhattan, city, county, and State of New York, have invented certain new and useful Improvements in Surveying Instruments, of which the following is a specification.

This invention relates to instruments used for surveying purposes and an object thereof is to provide means automatically operable whereby no difficulty will be experienced in the use of the instrument, the adjustments necessary in the case of surveying instruments as now constituted being eliminated.

Another object of the present invention is to provide a surveying instrument wherein gravitation and the floating properties of liquids are relied upon for always maintaining the instrument in condition for use and for insuring accuracy of the instrument at all times.

As well understood, in surveying instruments as now constructed, a great deal of time is consumed in adjusting the instrument for use, these adjustments being necessary in order that accuracy of the instrument may be insured before the same is placed for service and this being so it will be understood that unless the instrument is so adjusted the accuracy of the survey will be destroyed, and hence it becomes an object of this invention to provide an instrument wherein these adjustments are taken care of automatically.

In the accompanying drawings I have illustrated an embodiment of my invention, and referring to these drawings in general,—

Figure 1 illustrates in part sectional elevation a surveying instrument embodying my invention, the embodiment here illustrated being applied to the ordinary field glass forming a part of the usual surveying instrument;

Fig. 2 shows my improvement in elevation removed from the telescope or field glass; and Fig. 3 is a section taken through Fig. 1 on the line 3—3 for example, in the direction of the arrows.

Referring to the drawings in detail, in Fig. 1 I have illustrated a field glass or telescope 1 which may be of any desired construction, this member in the present instance being shown more or less diagrammatically inasmuch as the particular construction of the same forms no part of the present invention.

Mounted within the telescope and preferably spaced from the walls thereof is a tubular member 2, this member being concentric with the telescope. The tubular member 2 is filled with liquid 3, as will be apparent from an inspection of Fig. 3, this liquid being rectified liquid vaseline for example, or any other suitable transparent liquid that may be desired. The walls of the member 2 are provided with ports 4 in communication with the interior of the member 2 and also in communication with cylinders 5 mounted exteriorly of the member 2. I have here shown three of these cylinders but it is to be understood that the number may be varied as desired. Within each cylinder is a piston 6 controlled by a spring 7, the tension of which may be adjusted if desired through the medium of adjusting screws 8. The purpose of this construction is to always insure that the contraction and expansion of the liquid 3 within the tubular member due to climatic or other conditions will not affect the accuracy of the instrument.

Within the tubular member 2 I provide concentric rings 9 and 10 respectively, these rings being preferably thickened at the portions designated 11 and reduced at 12 for a purpose which will be pointed out hereinafter. These rings are secured to but spaced from each other at their thickened portions 11 by a member 13 extending longitudinally of the tubular member 2. The reduced portions 12 of the rings are secured to but spaced from each other by an air chamber 14 but it is to be understood that this air chamber may be dispensed with and some other means such as a float for example may be substituted therefor. Mounted for rotation in the reduced portions of the rings 12 and also extending longitudinally of the tubular member 2 is a shaft 15. Secured to this shaft is a transverse member 15' to which is pivotally secured a disk 16 which as will be seen from an inspection of Figs. 2 and 3 is suspended within the tubular member 2 and therefore in the liquid 3 therein. The disk 16 is provided with two slots at right angles to each other, viz. a vertical slot 17 and a horizontal slot 8, the latter being at the lower extremity of the former. Rigidly secured to the lower end of the disk 16 is a bridge 19 extending longitudinally of the tubular member 2 and provided adjacent its ends with alidades 20 and 21. These alidades are at all times parallel to the horizontal slot.

The rings 9 and 10 and the apparatus carried thereby which has just been described, are freely movable within the tubular member 2 and by reason of this fact and that the lower portions 11 of the rings are thickened, the tendency of the rings will be to move at all times into the position shown in Fig. 3, this movement being assisted by the air chamber 14 so that regardless of the position in which the field glass is held the slot 17 in the disk 16 will always assume a vertical position.

It will be seen, therefore, that the disk 16 has movement about two axes at right angles to each other, to wit, movement on its pivot and movement imparted to it about an axis at right angles to this movement by rotation of the rings 9 and 10.

In use, therefore, as just pointed out, the slot 17 always assumes a vertical position, being brought to that position by gravity and the properties of the liquid 3. It will be seen also that for the same reason the alidades 20 and 21 will always assume a position in line with the slot 18 and that the latter despite the fact that the rings 9 and 10 may be rotated within the tube 2 will always be brought by gravity and the liquid 3 to a horizontal position. It is therefore possible to use the instrument of the present invention without first setting the telescope for horizontal adjustment. In other words with the present instrument it is possible to obtain accurate surveys without the initial adjustment or setting of the instruments as required with instruments as constructed up to the time of this invention.

It will be apparent also that through the medium of the piston 6 that derangement of the instrument due to expansion and contraction of the liquid under climatic conditions is avoided.

It will be obvious from the foregoing that while I have here illustrated and described an embodiment of my invention, changes may be made in the details of construction illustrated and described within the purview of the invention.

What is claimed is:

1. In combination, a tube and a disk pivotally mounted in said tube and having two slots therein at right angles to each other, said disk having movement about two axes which are at right angles to each other.

2. In combination, a tube containing liquid, a disk pivotally mounted therein and provided with a horizontal and a vertical slot, and means coöperating with the liquid to assist gravity in maintaining the last-named slot in vertical position.

3. In combination, a tube, a disk pivotally mounted in said tube and provided with a slot, a member attached to said disk and having right members at its ends in alinement with said slot.

4. In combination, a tube having liquid therein, and a disk in said liquid pivotally mounted in said tube and provided with two slots at right angles to each other.

5. In a surveying instrument, the combination of a tubular member containing liquid, a disk pivotally mounted within said member and an air chamber operatively connected to said disk and functioning to assist in causing the disk to assume a vertical position relative to said tubular member.

6. In a surveying instrument, the combination of a tubular member containing liquid, a disk pivotally mounted within said member, an air chamber functioning to assist in bringing the disk to a vertical position and means for automatically compensating for contraction and expansion of the liquid within said member.

7. In a surveying instrument, the combination of a tubular member containing liquid, a disk having slots therein at right angles to each other, said disk being pivotally mounted in said tubular member, a cylinder exterior of said tubular member, a spring-pressed piston in said cylinder and a port in said cylinder communicating with the liquid in the tubular member for compensating for expansion and contraction of the liquid.

8. In a surveying instrument, the combination of a tubular member, spaced concentric rings suspended in said tubular member, a rotatable shaft secured to said rings, a disk mounted on said shaft, said disk having slots therein at right angles to each other and alidades secured to and carried by said disk automatically maintained parallel to one of the slots in the disk and parallel to the faces of said disk.

9. In a surveying instrument, the combination of a tubular member containing liquid, spaced concentric rings within said tubular member and freely movable relatively thereto, a disk pivotally secured to said rings and an air chamber secured to said rings whereby the rings will be automatically moved to position to cause the disk to be suspended vertically relatively to the longitudinal axis of said tubular member.

10. In a surveying instrument, the combination of a tubular member, concentric rings spaced from each other and mounted within said tubular member, said rings having thickened portions and reduced portions, a disk pivotally secured to said rings adjacent the reduced portions thereof, said rings functioning automatically to bring the disk at all times to a vertical position relatively to the longitudinal axis of the tubular member.

11. A surveying instrument comprising a field glass, a tubular member therein containing liquid, spaced rings within said tubular member, said rings being thickened at corresponding points in their periphery, means for rigidly securing said rings to each other at their thickened portions, said means functioning to maintain the rings spaced from each other, a shaft extending longitudinally and pivotally secured to the reduced portions of said rings, a disk secured to the last-named member, said disk being provided with a horizontal slot and a vertical slot, an air chamber secured to said rings adjacent the member carrying the disk, alidades secured to said disk and at all times parallel to the horizontal opening in the disk and to the faces of said disk, a cylinder mounted on the exterior of said tubular member and between it and the walls of the field glass, a spring-pressed piston within said cylinder and a port establishing communication between said cylinder and the interior of said tubular member whereby contraction and expansion of the liquid is automatically compensated, the thickened portions of said concentric rings and the air chamber functioning to bring the disk at all times vertical to the longitudinal axis of the field glass.

This specification signed this 6th day of April, 1920.

JERMAN ROSALES.